Oct. 9, 1956 R. E. FEARON Re. 24,226

WELL SURVEYING METHOD AND APPARATUS

Original Filed Sept. 17, 1941 3 Sheets-Sheet 1

Inventor

Robert E. Fearon

By Stevens and Davis

Attorneys

WELL SURVEYING METHOD AND APPARATUS
Original Filed Sept. 17, 1941 3 Sheets-Sheet 2
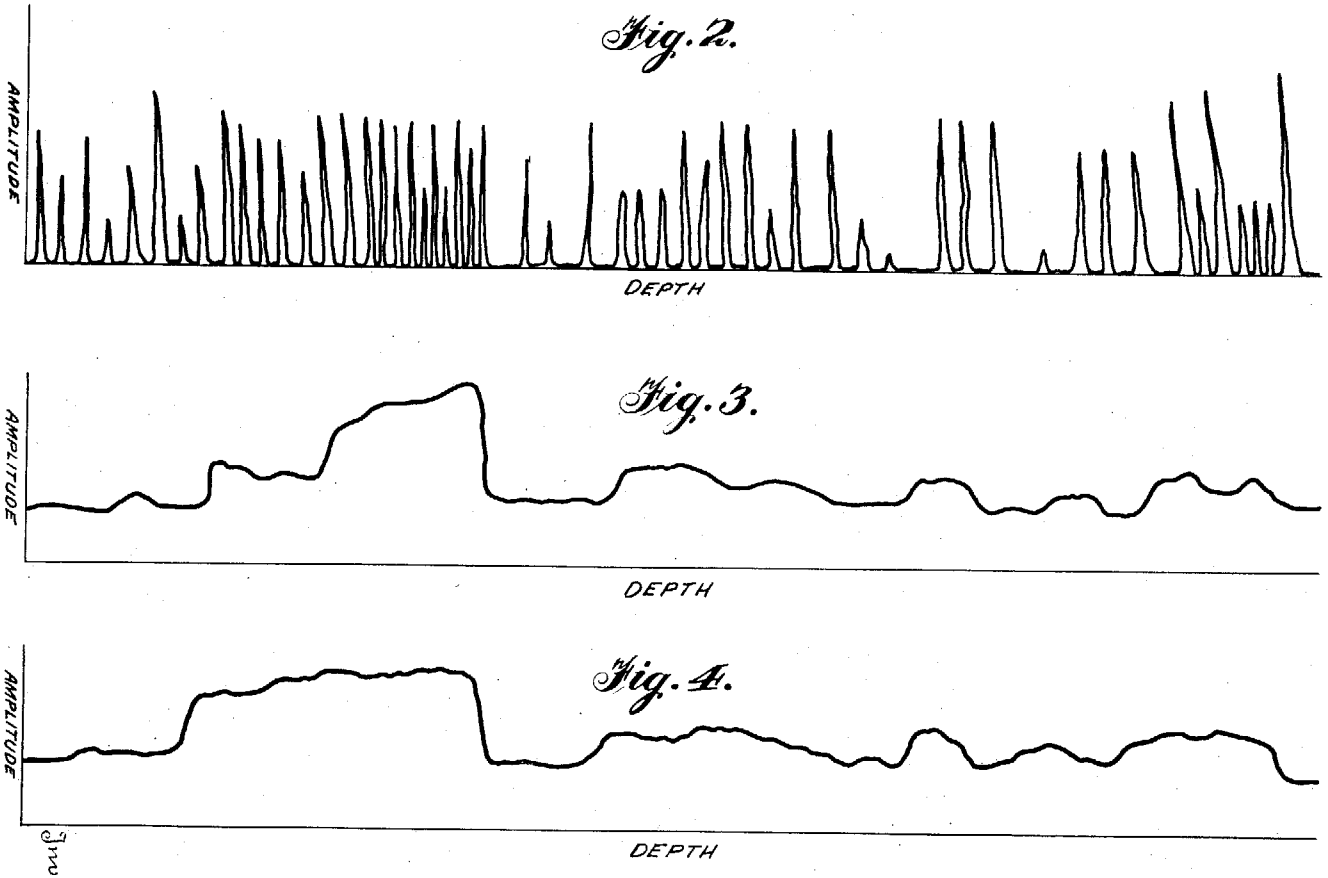
Inventor
Robert E. Fearon
By Stevens and Davis
Attorneys WELL SURVEYING METHOD AND APPARATUS
Original Filed Sept. 17, 1941 3 Sheets-Sheet 3
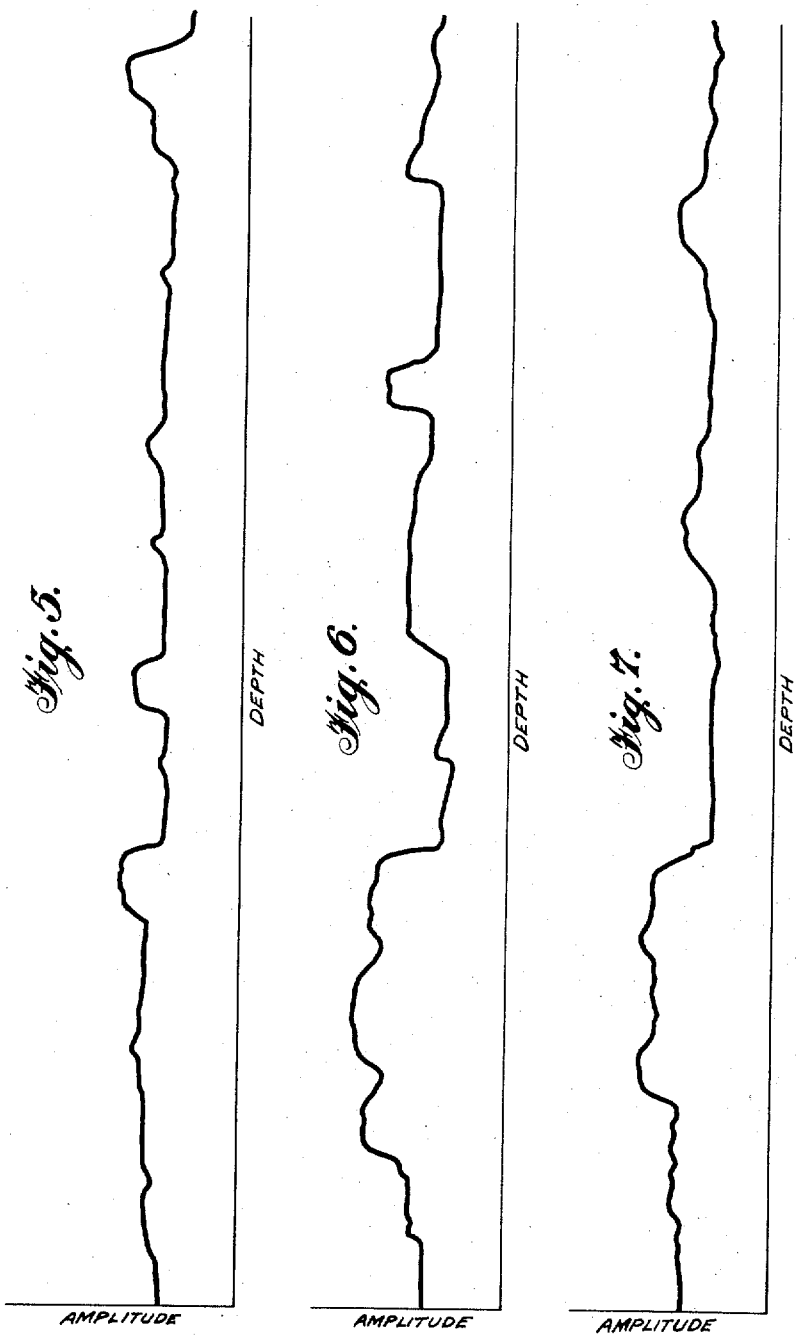
Inventor
Robert E. Fearon
By Stevens and Davis
Attorneys United States Patent Office Re. 24,226
Reissued Oct. 9, 1956

24,226

WELL SURVEYING METHOD AND APPARATUS

Robert Earl Fearon, Tulsa, Okla., assignor to Well Surveys, Incorporated, Tulsa, Okla., a corporation of Delaware Original No. 2,351,028, dated June 13, 1944, Serial No. 411,226, September 17, 1941. Application for reissue April 6, 1956, Serial No. 576,755

11 Claims. (Cl. 250—71)

Matter enclosed in heavy brackets [ ] appears in the original patent but forms no part of this reissue specification; matter printed in italics indicates the additions made by reissue.

This invention relates to geophysical prospecting and more particularly to a method and apparatus especially adapted to determine the nature of strata adjacent a bore hole by a spectral analysis of the gamma rays emerging therefrom into the bore hole.

Prior to this invention investigations of geological formations both from the interior of bore holes and from the surface of the earth have been made by detecting and measuring gamma radiations emerging from the formations. In every instance prior to the present invention, however, except for those described in a patent granted October 22, 1940, to Serge A. Scherbatskoy No. 2,219,274, and an application of Jacob Neufeld filed March 9, 1940, and assigned the Serial Number 323,239, which matured as Patent Number 2,296,176, the investigators have been content to measure the total intensity of the gamma rays emanating from the various formations and have not attempted to analyze these radiations to obtain further information.

In the investigation of Neufeld, Scherbatskoy and the present inventor, however, it has been discovered that an analysis of the nature of the gamma rays emanating from various formations often yields important additional information as to the nature of the formation. The The gamma rays from thorium C″ have a wave length of around $4.66\times10^{-11}$ cm. whereas those for radium B+C have a wave length of around $1323\times10^{-11}$ cm. Other materials emit gamma rays of still other wave lengths and hence the gamma rays from various formations usually differ in their wave lengths depending upon the material in the formation that gives rise to them. Thus, if not only the total intensity but also the spectral distribution of the gamma rays can be ascertained a further basis is obtained for distinguishing between various formations.

In using the Geiger-Müller counter for the measurement of gamma rays it has been customary to apply a potential to the electrodes sufficient so that the ionization caused by the action of a single quantum of gamma rays upon a molecule of the gas will be sufficient to cause an electrical break-down that will permit a current to flow until interrupted by the action of the ballast resistance in the external circuit of the counter tube. The current that flows has no relation in magnitude to the frequency of the gamma rays and it is only by counting the number of break-downs that occur during a given period of time that a determination is made of a substantially fixed proportion of the total number of gamma ray quanta at the point of measurement.

Recently there has come into more general use in place of the Geiger-Müller counter tube, an ionization chamber in which a higher pressure of gas is maintained. With this higher pressure of gas, ionization occurs practically continuously between the electrodes but the potential applied is not sufficient to cause the break-down phenomenon to occur and hence there results in the external circuit of the ionization chamber only a continuous current flow of varying magnitude instead of a series of electrical impulses. The magnitude of this continuous current is an indication of the total amount of ionization produced by the gamma rays and hence of the total energy exerted by the gamma rays in causing the ionization. Again, however, nothing is revealed as to the frequency of the gamma rays.

In the patent to Scherbatskoy and in the application of Neufeld, mentioned above, measurements of gamma rays are made with two ionization chambers one of which is shielded to a greater extent than the other so as to eliminate at least a portion of the lower frequency, less penetrating, gamma rays from measurement by that ionization chamber. By a comparison of the measurements made by the two ionization chambers an indication of the average wave length of the gamma radiation is obtained. This indication, however, still fails to indicate whether all of the gamma rays are of some particular intermediate frequency or whether the average is made up of gamma rays of low frequencies and gamma rays of high frequencies.

According to this invention, it has been noted that the energy included in a quantum of gamma rays is proportional to the frequency of the gamma rays in accordance with the formula $E=hv$ where E is the energy per quantum, h is Plancks constant and v is the frequency. Thus, if the entire energy of a quantum of gamma rays is absorbed in the production of ion pairs and the total production of ion pairs is measured, the magnitude of the measurement will increase as the frequency of the gamma rays increase. Under these circumstances, if each quantum of gamma rays is separately detected and measured by the ionization chamber circuit without any break-down phenomenon occurring which tends to make all measurements of equal intensity, but instead with the natural intensity of each measurement being recorded, then a record will be produced of not only the total number of gamma ray quanta detected but also of the frequency of the gamma rays constituting each quantum.

The present invention overcomes these difficulties and provides a method and apparatus for rapidly and efficiently detecting and measuring the wave lengths of a representative sample of the gamma rays at any given location. To this end an ionization chamber has been designed which has sufficient volume in relation to its gas pressure so that when a quantum of gamma rays enters the chamber and reacts with the molecule of the gas to liberate one or more beta particles, the beta particles will in the great majority of instances have sufficient opportunity to complete their travel and form as many ion pairs as they are capable of forming. Electrodes are placed in this ionization chamber in close enough proximity to each other so that the ions formed are efficiently collected and the potential applied to the electrodes is such as to facilitate this collection without causing any break-down phenomenon to occur. With all of this, the chamber is constructed to be of such size and to contain such a concentration of gas as will cause the absorption of a sufficient number of quanta of gamma rays to make possible rapid and accurate measurement without at the same time causing an absorption of so many gamma rays that their characteristics cannot be separately recorded.

In order to record the characteristics of the gamma rays so detected with sufficient speed so that there will not be appreciably overlapping between the recordings of two or more quanta of gamma rays it has been necessary to employ a recording circuit for the detector that has a very low time lag. For example, it has been found desirable to detect and record the characteristics of about 100 quanta of gamma rays per second and to accomplish this it is desirable that the recording system have a time lag not in excess of a thousandth of a second and preferably less.

It has been observed that the usual ionization chamber containing four liters of nitrogen under thirty atmospheres of pressure absorbs about a hundred quanta of gamma rays per second under average room conditions, not however giving any detailed information as to the number of quanta or their individual characteristics, only registering total ionization due to the hundred quanta. The best Geiger-Müller counters of the same dimensions absorb about five quanta per second under average room conditions and yield a count of the number of quanta absorbed but no information as to the frequency of the gamma rays constituting each quantum.

In an ionization chamber containing approximately 4 liters of nitrogen at around 450 pounds per square inch of pressure, and with the electrodes spaced 1 centimeter apart and a voltage of 1,000 volts applied to them, about 100 quanta of gamma rays per second will be detected. If the recording circuit is sufficiently rapid and sensitive an independent record of each quantum may be made, which record will indicate not only the detection of each quantum but also the total energy and thus the frequency of the gamma rays constituting it.

If the current through the ionization chamber is observed by measuring the voltage produced across a resistor having a resistance of the order of $10^{12}$ ohms, it cannot be measured quickly enough by ordinary means to permit distinctions between individual quanta. To permit the measurement to be made with sufficiently great speed, a circuit which adds IR and $$A\frac{d}{dt}IR$$

may be used. Such a circuit is described in this inventor's application for United States patent, Serial No. 311,217, which matured as Patent Number 2,275,747. Such a circuit, with its output connected to a fast recording galvanometer will permit records to be made of impulses lasting very short intervals, if desired, of the order of $1/1000$ second or less.

A more complete understanding of the details and advantages of this invention may be had by a consideration of the following description of the preferred embodiment of it. It is to be understood, however, that numerous modifications in the construction of the apparatus and the details of the method may be made without departing from the spirit of the invention. The invention in its broader aspects includes surface exploration as well as exploration in wells or other openings in the earth and even includes the inspection of samples brought to a laboratory. The dimensions of the detector, the pressure or kind of gas used, the voltage applied and the resistance placed in series with the detector are all subject to variation and are all more or less interdependent so that one factor may quite often be varied and another of the factors varied to compensate for this variation. All these things, however, are changes that would be expected of one skilled in this art and hence the method and apparatus as so modified is within the scope of this invention.

In the drawings:

Figure 2 is a recording such as would be taken by the device of the present invention;

Figures 3, 4, 5, 6 and 7 are curves showing graphically various information that may be obtained from the curve of Figure 2.

Figures 1, 8:
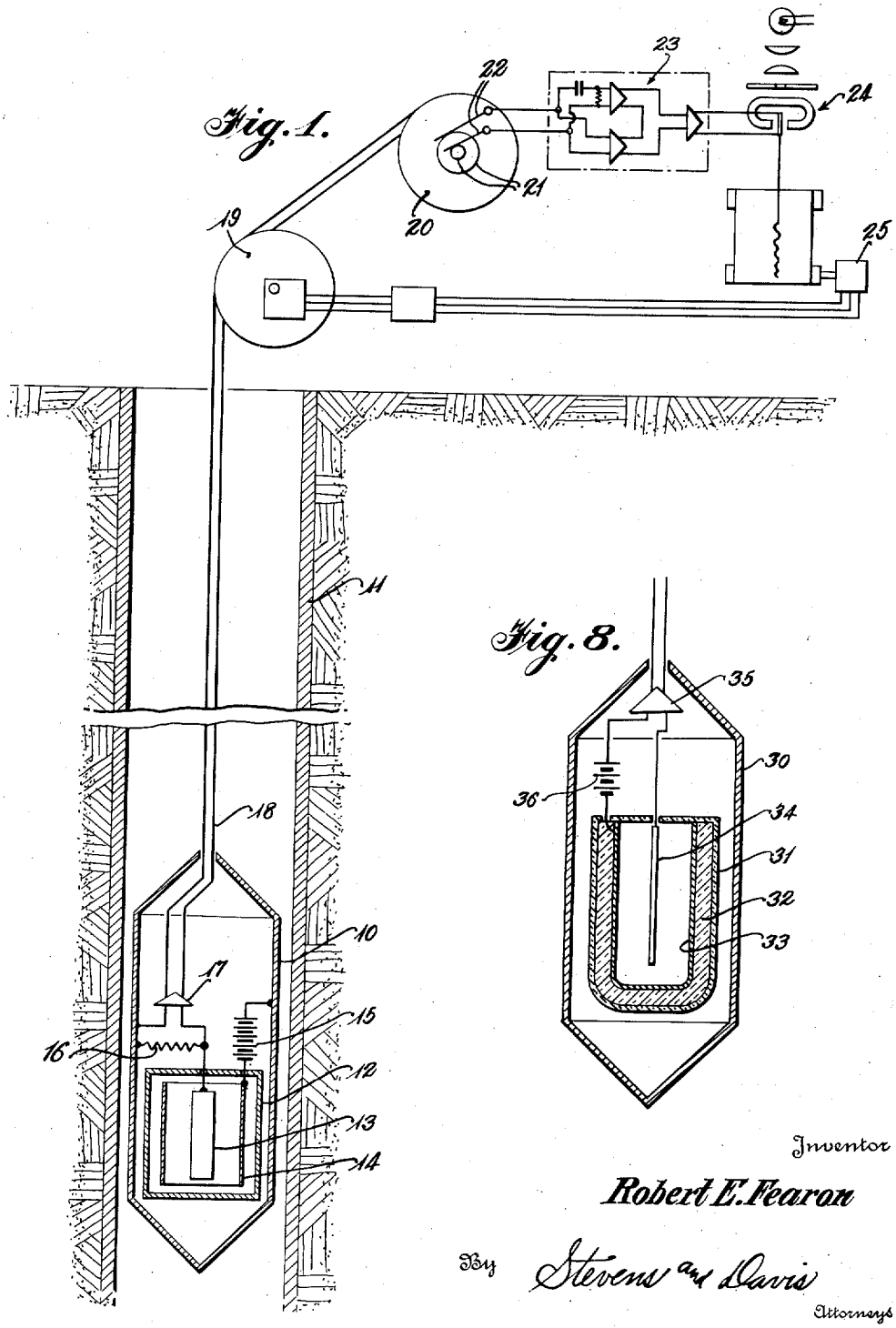
Figure 1 is a diagrammatic illustration of a device for exploring subsurface strata by lowering a detector into a drill hole in accordance with the principles of this invention.
Figure 8 is a schematic illustration of a modified form of exploring capsule.

As illustrated in Figure 1 a device constructed according to the principles of the present invention may comprise a casing or capsule 10 adapted to be lowered into a well bore 11 which may be either cased or uncased. Within the casing 10 there may be positioned an ionization chamber 12 containing a pair of electrodes 13 and 14 spaced about 1 centimeter apart and connected through and insulated from the chamber walls. The chamber may desirably be filled with nitrogen at a pressure of around 450 lbs. per square inch.

Outside of the ionization chamber but within the casing 10 a battery 15 may be provided for the purpose of supplying a potential between the electrodes of the ionization chamber. This battery preferably has a voltage of around 1000 volts and has its negative pole connected to the outer electrode and its positive pole grounded to the casing. The inner electrode 13 is connected through a resistance 16 to the casing to complete the circuit.

It has been found that if the resistor has a resistance of around $10^{12}$ ohms and the ionization chamber a capacity of $2\times10^{-10}$ farads the time lag in the circuit can easily be overcome by use of the circuit described in the above mentioned application 311,217.

Across the resistor 16 the input of a linear amplifier 17 is connected and the output of the amplifier 17 is connected through a cable 18 to the surface of the earth. This cable serves also to support the detecting unit in the well bore. The amplifier may be any one of the modern high fidelity linear amplifiers that have a relatively high amplification ratio.

At the surface of the earth the cable 18 passes over a measuring wheel 19 and is wound onto a cable drum 20 which may be rotated by any suitable means, not shown, to raise and lower the detecting unit in the hole. The conductors in the cable 18 are connected through slip rings 21 and brushes 22 at the cable drum 20 so that the currents from these conductors pass to a device 23 on the surface. The device 23 consists of a circuit of the type described in application 311,217 and an amplifier. The recording tape of the galvanometer is driven either mechanically or by an electrical transmission system such as the "Selsyn" motor arrangement 25 from the measuring wheel 19.

A record of the type obtained by use of the above device is illustrated in Figure 2. From the curve of Figure 2, there may be obtained the following information:

a. The frequency of occurrence of pulses, whatever their nature. (Fig. 3) This is the same data which would be obtained by a Geiger-Muller counter.

b. The average value of the curve which records the pulses as measured from its base line (Fig. 4). This curve corresponds with that which would be obtained with an ordinary ionization chamber device, of the prior art.

c. A curve which represents the average rate of occurrence of pulses of magnitude less than some specified magnitude (Fig. 5) not obtainable by methods of the prior art.

d. A curve which represents the average rate of occurrence of pulses greater than some specified magnitude, (Fig. 6) not obtainable by devices of the prior art.

e. A curve which represents the average rate of occurrence of pulses lying in a specified range or within specified ranges of magnitude, not obtainable by methods of the prior art (Fig. 7).

Curves corresponding to a, b, c, d and e may be produced from the curve of Fig. 2 by graphic means, or by counting, or by means of automatic devices, as desired. If desired, curves of Figures 3 to 7 may be produced at the time the log is made at the well.

In many instances such information is extremely useful in distinguishing between adjacent strata so as to find interfaces not otherwise determinable, or in tracing particular strata through an area in which the strata being traced lie in close proximity to other very similar strata.

The modified type of exploring capsule illustrated in Figure 8 is also useful in producing signals having a magnitude proportional to the energy of quanta absorbed. In this device a casing 30 is provided within which is mounted an evacuated gas-tight envelope 31 internally surfaced with a layer of fluorescent material such as zinc silicate 32 which in turn carries a thin photoelectric film of a photo-active substance such as metallic caesium 33. An electrode 34 mounted axially within the envelope 31 is connected to an amplifier 35 corresponding to the amplifier 17 above described. A connection is also provided between the amplifier 35 and the photoelectric film 33 through a potential source 36 which is connected in a manner such that a constant potential difference exists between the film and the electrode. It is to be understood that the layer of fluorescent material 32 is of sufficient density and thickness that the probability of photon interaction upon exposure to gamma radiation is considerable although beta rays liberated by the photons will in general exhaust their range of travel within the substance. The layer of photo-active material which preferably is caesium is nearly transparent and of microscopic thinness as is conventional in photoelectric cells and similar devices.

The physical constants of the unit are adjusted to cause its capacity to be of the order $40\times10^{-12}$ farads. In operation photons created by interaction of gamma radiation with the fluorescent layer act upon the photoelectric layer resulting in migration of electrons into the evacuated interior of the envelope toward the central electrode thus causing a signal to be transmitted to the amplifier which, after suitable magnification, is transmitted to surface equipment, as described in connection with Figure 1 of the drawings. It is to be noted that the processes involved whereby the gamma rays are translated into signals operate at degrees of efficiency independent of the energy of the initial quanta, thus the signal transmitted to the recording equipment is to a reasonable degree of approximation proportional to the energy of the initially received quanta.

I claim:

1. A method of determing the nature of substances that comprises deriving from individual quanta of gamma rays emanating therefrom an ionization proportional to the energy in each quantum, separately converting the ionization caused by each quantum into an electrical impulse, amplifying, and recording the magnitude of the current corresponding to each quantum, separately.

2. A method of geophysical prospecting that comprises detecting, at a continuously varying depth, individual quantum of gamma rays emitted from subsurface formations at said continuously varying depth, converting the substantially total energy of each individual quantum of gamma rays into an electrical impulse and recording the magnitude of each electrical impulse in correlation with an indication of the depth at which said gamma rays were detected separately and distinctly from the record of the preceding and succeeding electrical current.

3. A device for geophysical prospecting that comprises an ionization chamber containing a pair of electrodes and a gas under pressure, the size of said chamber and the pressure of said gas being such as to cause the secondary beta particles produced by the absorption of gamma rays to be totally absorbed by the gas, means to supply an electrical potential to the said electrodes, the voltage so applied and the spacing of the electrodes being such as to cause a substantially complete collection of the ions due to a beta particle before there exists an appreciable probability of the occurrence of another beta particle, a resistance in series with the said source of potential and electrodes, the said resistance being of such an order of magnitude that the thermal noise which it will impart to an amplifier will be negligible in comparison with the magnitude of the impulses which the amplifier is destined to receive due to the presence of beta particles in the ionization chamber, amplifier and recording means operating from the voltage and the rate of change of voltage developed across said resistor, the said amplifying and recording means having an appropriate electrical frequency transmission spectrum suitable to accurately represent the impulses received in the ionization chamber.

4. A device as described in claim 3 further characterized in that the detecting unit, source of potential, resistance and amplifier are contained in a casing adapted to be lowered into an opening in the earth, the recorder is located on the surface of the earth and means are provided to move the recording tape of the recorder in accordance with the variations in depth of the detecting mechanism so as to make a record correlating the determinations of the number and nature of the gamma ray quanta with indications of the depth at which the determinations were made.

5. A method of radioactivity well logging that comprises detecting individual quanta of gamma rays emitted by the formations, determining the energy of the said quanta and recording the variations of the said energy with respect to the depth of the hole.

6. A method of radioactivity well logging in which gamma radiations are detected that consists in producing electrical current impulses the magnitudes of which are related to the energy of the detected gamma radiations and recording the variations of the magnitude of these current impulses with the depth of the hole.

*7. A method of geophysical prospecting that includes detecting at a continuously varying depth individual quantum of gamma rays emitted from subsurface formations at said continuously varying depth which comprises traversing a scintillating material in proximity to said formations to intercept said emitted gamma rays, converting the energy of each individual quantum of gamma rays into an electrical impulse, and recording the magnitude of each electrical impulse in correlation with an indication of depth at which said gamma rays were detected separately and distinctly from record of the preceding and succeeding electrical current.*

*8. Geophysical prospecting apparatus for detecting individual quanta of gamma rays emitted from subsurface formations and encountered at various depths which comprises means for intercepting said individual quanta of gamma rays emitted from said formations and for converting the energy of said individual quanta of gamma rays into discrete electrical impulses with magnitudes related to the respective energies of said quanta, and means for producing a record of the magnitudes of each of said discrete electrical impulses in correlation with the depth at which said gamma rays were detected, said last mentioned means recording each of said magnitudes separately and distinctly from the record of both the preceding and succeeding electrical currents.*

*9. In a meter for the detection and measuring of gamma rays in combination, a crystal capable of scintillating under the impact of gamma rays, said meter having a photosensitive surface illuminable by the scintillations from said crystal, for converting same into electronic emissions, means associated with said photo-sensitive surface to amplify said electronic emissions, and an indicator electronically connected to said means for signalling the characteristics of the radiation bombarding said crystal.*

*10. In a meter for the detection and measuring of gamma rays, in combination, a crystal capable of scintillating under the impact of gamma rays, said meter having a photosensitive surface illuminable by the scintillations from said crystal, for converting same into electronic emissions, and a rate meter remotely connected electronically to said means for signalling the characteristics of the radiation bombarding said crystal.*

*11. In a meter for the detection and measuring of gamma rays in oil well bore holes, in combination, a*

*crystal capable of scintillating under the impact of gamma rays, a photo-sensitive surface in association with said crystal, means for signalling the energy characteristics of the radiation bombarding the crystal, whereby the nature of the radiation sources is ascertained, said means including an amplitude discriminator electronically connected to said photo-sensitive surface.*

References Cited in the file of this patent or the original patent

UNITED STATES PATENTS

| | | |
|---|---|---|
| 2,133,776 | Bender | Oct. 18, 1938 |
| 2,197,453 | Hassler | Apr. 16, 1940 |
| 2,219,274 | Scherbatskoy | Oct. 22, 1940 |
| 2,275,456 | Neufeld | Mar. 10, 1942 |
| 2,285,840 | Scherbatskoy | June 9, 1942 |
| 2,288,278 | Howell | June 30, 1942 |
| 2,296,176 | Neufeld | Sept. 14, 1942 |

OTHER REFERENCES

"Physical Review," vol. 43, June 1, 1933 (pages 871 to 874).